United States Patent

Fujisawa et al.

[15] 3,706,805

[45] Dec. 19, 1972

[54] PROCESS FOR THE PREPARATION OF ARYL SULFIDES

[72] Inventors: Tamotsu Fujisawa, Yamato-shi; Noriko Ohtsuka, Sagamihara-shi; Takeo Kobori, Nakano-ku; Genichi Tsuchihashi, Tokyo, all of Japan

[73] Assignee: Sagami Chemical Research Center, Tokyo, Japan

[22] Filed: Sept. 16, 1970

[21] Appl. No.: 72,821

Related U.S. Application Data

[63] Continuation-in-part of Ser. No. 719,743, April 8, 1968

[30] Foreign Application Priority Data

April 15, 1967 Japan .................................. 42/24395

[52] U.S. Cl. ................ 260/609 E, 71/98, 260/609 F, 424/337

[51] Int. Cl. ............................................. C07c 149/30

[58] Field of Search ................ 260/609 E, 609 F, 608

[56] References Cited

UNITED STATES PATENTS 2,402,685   6/1946   Signaigo ............................... 260/608

*Primary Examiner*—Lewis Gotts
*Assistant Examiner*—D. R. Phillips
*Attorney*—Flynn & Frishauf

[57] ABSTRACT

Aromatic sulfides are prepared by reacting 6—20 molar proportions of certain aromatic compounds with one molar proportion of a sulfur chloride in the presence of iron at 0°–50°C. The compounds have a variety of uses, including use as herbicides and fungicides.

8 Claims, No Drawings

PROCESS FOR THE PREPARATION OF ARYL SULFIDES

RELATED APPLICATIONS

This application is a continuation-in-part of Ser. No. 719,743, filed Apr. 8, 1968 now abandoned. Related application Ser. No. 720,388, filed Apr. 10, 1968 now abandoned is directed to the preparation of polythioethers by reaction of diphenyl ether with sulfur halides.

FIELD OF THE INVENTION

The present invention relates to a process for the preparation of aryl sulfides and to novel aryl sulfide compounds prepared by the present process. Aryl sulfides are useful as industrial chemicals such as mothproofing agents, herbicides, lubricants, antioxidants and organic semi-conductors, as a chemical intermediate for them, as a pharmaceutical intermediate, as a reactant in the preparation of numerous mineral oil additives, and as a starting material for the synthesis of a multitude of sulfide derivatives. Several of such uses are mentioned, for example, in the text: Organic Chemistry of Bivalent Sulfur, Volume II, E. Emmet Reid, Chemical Publishing Co., Inc., N.Y., 1960.

BACKGROUND OF THE INVENTION

Various known methods for the preparation of aryl sulfide have generally suffered from limited applicability, because severe reaction conditions or complicated procedures were required. Thus, a limited number of aryl sulfides have been synthesized. For example, only two isomers of symxylyl sulfide, i.e. bis(2,6-dimethylphenyl) sulfide and bis(2,3-dimethylphenyl) sulfide, have so far, been reported. The method of the preparation of aryl sulfides disclosed by this time may be classified into the two processes as follows:

1. A process which involves the reaction of thiophenols or alkali sulfides with aryl halides, and
2. A process which involves the reaction of aromatic compounds with sulfur chlorides or sulfur. However, the starting materials required for process (1) are not readily obtainable, and the process requires a very high reaction temperature, and process (2) usually requires a large amount of aluminum chloride, which makes the procedure very complicated because of the need of hydrolyzing the complex with aluminum chloride initially formed. Accordingly, neither processes can be regarded as satisfactory for use on a commercial scale.

As indicated in our parent application Ser. No. 719,743, $FeCl_3$ has also been found to be an effective catalyst for process (2) in which sulfur chlorides are used. However, several disadvantages weigh against the use of this catalyst. It is not as available, nor as cheap in cost as the catalyst of this invention. It is hygroscopic and can not be used effectively in hydrous form in process (2), and can not be recovered readily following completion of reaction.

SUMMARY OF THE INVENTION

This invention has as an object the preparation of aryl sulfides. A further object is the simple preparation of aryl sulfides by a very economical method. A still further object is to provide novel aryl sulfide compounds. Other objects will be apparent from a reading of the following description of the invention.

These objects are accomplished by reacting certain aromatic compounds with an appropriate sulfur chloride in the presence of a trace amount of an iron. From about 6 to about 20 molar proportions of an aromatic compound is used with one molar proportion of a sulfur chloride.

The present invention thus has an advantage of requiring only a trace amount of catalyst, of carrying out the reaction readily even at room temperature, and of simple treatment. The present invention consists in a novel sulfuration reaction which is regarded as a basic reaction of aromatic substitution such as sulfonation, nitration, halogenation, and Friedel-Crafts reaction of aromatic compounds.

DETAILED DESCRIPTION OF THE INVENTION

The catalyst employed in the present invention comprises an iron or an alloy thereof. Iron is generally used as a powder, but solid iron, even a nail promotes this sulfuration. The amount of the catalyst employed in the present process is a so-called catalytic amount, and an amount within the range of 0.0001 mole to 10 mole percent of catalyst per mole of sulfur chloride is usually employed.

The sulfur chlorides which are used as the starting material in the present invention are sulfur monochloride ($S_2Cl_2$) and sulfur dichloride ($SCl_2$). In the system of sulfur monochloride with iron, an induction period was observed; however, the use of sulfur dichloride leads to a rapid formation of aryl sulfides without an induction period.

The reaction is preferably carried out in a solvent which solves the starting materials and is inert with reactants, products and catalysts in the present reaction, but the sulfides have also been prepared without a solvent. Typical solvents include: diethylether, carbon tetrachloride, chloroform and dichloromethane. Carbon tetrachloride is preferred.

The molar ratio of aromatic compound to sulfur chlorides employed in the process of this invention is from about 6 to about 20, preferably from about 9 to about 12. The upper limit of the amount of aromatic compound present in the reaction mixture appears to be governed only by economic considerations. However, as a practical matter, the molar ratio of aromatic compound to sulfur chlorides generally will not exceed about 20.

The sulfuration goes forward at temperature over a wide range, such as 0° to 100°C., but initiates most readily when kept standing at room temperature. A preferred temperature is from 0° to 50°C. Under these conditions the reaction is, in general, exothermic and goes forward to completion with good yield calculated upon the basis of consumed starting materials.

This reaction is most advantageously carried out in the absence of light, for avoiding the formation of byproducts from the disproportionation of the sulfur chlorides.

In practicing this invention usually an excess of aromatic compound is allowed to react at room temperature with 0.03 to 0.05 percent by weight of the catalyst while an appropriate sulfur chloride is added. The evolution of hydrogen chloride commences soon after the addition of sulfur chloride is started, and the reaction is complete when no more hydrogen chloride is evolved. The aryl sulfide product is isolated by a treatment of distillation or recrystallization. When production of the present compounds is to be carried out on an industrial scale, various other methods of separation and purification may be preferred, including, for example, hydrogenation for eliminating byproducts and the like.

It is also to be noted that some novel compounds are obtained by the invention. Examples of the compounds of this invention include: bis(4-phenoxyphenyl) sulfide; bis(2,4-dimethylphenyl) sulfide; 2,4-dimethylphenyl 2,6-dimethylphenyl sulfide.

The following examples are given to illustrate the present invention. The amounts of materials referred to are given as parts by weight unless otherwise indicated.

Example 1

To a solution of 215 parts of anisole in 720 parts of dry diethyl ether was added 135 parts of sulfur monochloride. When a trace amount (0.10 – 0.30 parts) of iron powder was added to this ether solution, an exothermic reaction began to take place with an evolution of hydrogen chloride gas after an induction period of a few minutes. The reaction mixture was stirred for one hour at room temperature to complete the reaction. Distillation under reduced pressure gave bis(4-methoxyphenyl) monosulfide which boiled at 140° – 155°C/0.2 mmHg. Recrystallization from ethanol afforded 88 parts (37 percent yield) of a sample which melted at 45° – 46°C.

The results obtained by the use of iron catalyst in the reaction of anisole and sulfur monochloride are given in Table 1.

TABLE 1

| Catalyst (0.1 –0.3 parts) | Induction period of the reaction | Yield % of bis(4-methoxyphenol) monosulfide |
|---|---|---|
| Fe | 3 –4 min. | 37 |

The yields of bis(4-methoxyphenyl) monosulfide by the reaction of anisole with sulfur monochloride in the absence of any solvent catalyzed by iron with various molar ratios of the reactants are shown in Table 2 below.

Table 2

| Molar ratio | | Yield % |
|---|---|---|
| $CH_3O-\langle\phantom{x}\rangle$ | $CH_3O-\langle\phantom{x}\rangle-S-\langle\phantom{x}\rangle-OCH_3$ | |
| $S_2Cl_2$ | | |
| 1 | 2 | 15 |
| 1 | 8 | 55 |
| 1 | 20 | 49 |

Example 2

To a solution of 215 parts of anisole in 720 parts of dry diethyl ether, 103 parts of sulfur dichloride were added. An exothermic reaction began to take place with an evolution of hydrogen chloride gas as soon as a trace amount (0.1 – 0.3 parts) of iron powder was added to this solution. The reaction mixture was stirred for one hour at room temperature to complete the reaction. Distillation under reduced pressure gave bis-(4-methoxyphenyl) monosulfide with a boiling point of 140° – 155°C./0.2 mmHg, which was recrystallized from ethanol to give 88 parts (37 percent yield) of a sample with a melting point of 45° – 46°C.

Example 3

A red glass flask, which is shielded from light of wave length below 6000 A, fitted with a magnetic stirrer bar, a red-glass dropping funnel and a condenser was flushed with nitrogen. In the flask were placed 1.0 mole of anisole and ca. 30 mg of iron-powder at room temperature. Then a solution of 0.1 mole of an appropriate sulfur chloride in 20 ml of carbon tetrachloride was added in portions over a period of 2 hours. The mixture was stirred until the evolution of hydrogen chloride was complete (ca. 1 hour). Bis(4-methoxy-phenyl) monosulfide was isolated by distillation followed by recrystallization from ethanol. Yield; $Fe-S_2Cl_2$ system 74%, and $Fe-SCl_2$ system 65%.

Example 4 (Comparative Example)

The procedure of Example 3 was repeated except that the reaction carried out in the presence of light. Yield; $Fe-S_2Cl_2$ system 69%, and $Fe-SCl_2$ system 57%.

Example 5

The procedure of Example 3 was followed, however, the reactants, and catalyst were:
phenetole — 1424 parts
$S_2Cl_2$ — 135 parts
iron powder — 0.3 – 0.5 part
(phenetole/$S_2Cl_2$ = 11.7).
The yield of bis(4-ethoxyphenyl) monosulfide was 78 percent. This sulfide is in the form of white needles and has a melting point of 55° – 56°C.

Example 6

The procedure of Example 3 was followed, however, the reactants and catalyst were:
phenetole — 1420 parts
$SCl_2$ — 103 parts
iron powder — 0.3 – 0.5 part
(phentole/$SCl_2$ = 11.6).
The yield of bis(4-ethoxyphenyl) monosulfide was 74 percent.

Example 7

Again the procedure of Example 3 was employed. The reactants and catalyst were:
diphenyl ether — 680 parts
$S_2Cl_2$ — 68 parts
iron powder — 0.3 – 0.5 part
(diphenyl ether/$S_2Cl_2$ = 8).
The product obtained was bis(4-phenoxyphenyl) monosulfide in the form of leaflets. The sulfide has a melting point of 101° – 102°C. The yield was 70 percent.

Elemental Analysis. Found: C, 77.39; H, 4.98
Calculated for $C_{24}H_{18}O_2S$: C, 77.84; H, 4.86.

This substance has not been reported so far in the literature, and its structure was identified as a parasubstituted sulfide by examination of its infrared absorption spectrum (1900 $Cm^{-1}$ and 840 $cm^{-1}$).

Example 8

The procedure of Example 3 was employed with the following reactants and catalyst:

m-xylene — 85 grams
$S_2Cl_2$ — 13.5 grams
iron powder — 30 mg
(m-xylene/$S_2Cl_2$ = 8).

The product obtained was a mixture of tetramethyldiphenyl monosulfides, having a boiling point of 137° - 141°C./mmHg. Yield was 71 percent.

This product separated by distillation into bis(2,4-dimethylphenyl) monosulfide having a boiling point of 125° - 127°C./0.36 mmHg (yield 93 percent), and 2,4-dimethylphenyl 2,6-dimethylphenyl monosulfide having a melting point of 53° - 54°C. (yield 7 percent). Both of these compounds are novel compounds.

Example 9

The procedure of Example 3 was employed with the following reactants and catalyst:

m-xylene — 850 parts
$SCl_2$ — 105 parts
iron powder — 0.3 – 0.5 part
(m-xylene/$SCl_2$ = 8).

A mixture of tetramethyldiphenyl monosulfides was obtained. The mixture has a boiling point of 122° - 126°C./mmHg. The yield was 63 percent. The mixture was fractionated, by distillation into bis(2,4-dimethylphenyl) monosulfide (yield 89 percent) and 2,4-dimethylphenyl-2,6-dimethylphenyl) monosulfide (yield 11 percent).

As indicated above, the sulfides have activity as herbicides and fungicides. The herbicidal activity of bis(4-methoxyphenyl) monosulfide (Example 3, above) was evaluated. The compound is applied to a soil in which the seeds of *Cyperus japonica*, Millet grass and *Stellarica Alsiue Var. undulata*, and rice plant seeds are contained. *Cyperus japonica* is a grass known as one of the most resistant to herbicides.

Firstly, 50 g of the soil was charged into a pot made of polystyrene, having a surface area of about 1/200 m², and then the seeds were seeded into the surface of the soil. Thereafter, about 10 cc of an aqueous solution containing 1,000 ppm of the test compound was added to the surface of the soil at a dosage of 200 g per acre (100 mg/pot). Further, the treated soil was maintained in status of a paddy field by the addition of water, and was allowed to stand in a greenhouse at a constant temperature of 25°C. 14 days after the treatment, the soil treating activity was examined. Through this procedure, the following results were obtained.

SOIL TREATING ACTIVITY

| compound | rice plant | Cyperus japonica | Millet grass | Stellarica Alsiue Var. undulata |
|---|---|---|---|---|
| Bis(4-methoxyphenyl) sulfide | − | +++ | ++ | ++ |

Note:
+++ Activity is very large
++ Activity is medium
+ Activity is small
− No activity.

The fungicidal activity of bis(4-methoxyphenyl) monosulfide (Example 3) was also evaluated with respect to *Pellicularia sasakii* (P.S.) and *Pyricularia oryzae* (P.O.). The test compound containing an aqueous solution in the following concentration is sprayed on rice plants grown to 3 or 4 foliar stage in a greenhouse, and on the next day, the plants are infested with the fungi from a culture by spraying the fungi-containing suspension to the plants. The infested plants are maintained in the greenhouse 7 days for P.S. and 5 days for P.O. After the treatment, the extent of disease control is estimated. Using this procedure, the following results are obtained.

| Test Compound | Concentration | P.S. | P.O. |
|---|---|---|---|
| Bis(4-methoxyphenyl) sulfide | 500 ppm | *46 | *50 |

* These values are calculated from the following formula:
The percent disease control = (A − B)/A × 100
A: The number of lesional spots per foilage in an untreated plant.
B: The number of lesional spots per foilage in a treated plant.

As seen from the foregoing test results, the compound, bis(4-methoxyphenyl) monosulfide, is useful as a fungicide which does not contain chlorine or arsenic.

What we claim is:

1. Process for the production of an aromatic monosulfide which comprises:

reacting from about 6 to about 20 molar proportions of an aromatic compound selected from the group consisting of anisole, phenetole, diphenyl ether, xylene and diphenyl sulfide, with one molar proportion of a sulfur chloride in the presence of a catalytic amount of a catalyst consisting essentially of metallic iron at a temperature of from 0° to 50°C. in the presence of a non-aqueous solvent and recovering said aromatic monosulfide from the resulting reaction mixture.

2. Process of claim 1, wherein from about 9 to about 12 molar proportions of the aromatic compound are employed.

3. Process of claim 1, wherein the non-aqueous solvent is selected from the group consisting of diethylether, carbon tetrachloride, chloroform and dichloromethane.

4. Process of claim 1, wherein the non-aqueous solvent is carbon tetrachloride.

5. Process of claim 1, wherein reaction is conducted in the substantial absence of light.

6. Process of claim 1, wherein the catalyst is employed in the range of 0.0001 − 10 mole percent per sulfur chloride.

7. Process of claim 1, wherein the chloride is sulfur monochloride.

8. Process of claim 1, wherein the chloride is sulfur dichloride.

* * * * *